United States Patent [19]

Go

[11] 4,398,017

[45] * Aug. 9, 1983

[54] COPOLYESTERS

[75] Inventor: Santos W. Go, Toledo, Ohio

[73] Assignee: Owens-Illinois, Inc., Toledo, Ohio

[ * ] Notice: The portion of the term of this patent subsequent to May 17, 2000, has been disclaimed.

[21] Appl. No.: 356,555

[22] Filed: Mar. 9, 1982

[51] Int. Cl.$^3$ .............................................. C08G 63/66
[52] U.S. Cl. .................................. 528/173; 528/176; 528/193; 528/194; 528/195
[58] Field of Search ............... 528/173, 176, 193, 194, 528/195

[56] References Cited

U.S. PATENT DOCUMENTS

| | | |
|---|---|---|
| 2,973,339 | 2/1961 | Muenster et al. .................. 528/195 |
| 3,558,557 | 1/1971 | Hrach et al. ........................ 528/195 |
| 4,145,517 | 3/1979 | Go ....................................... 528/173 |
| 4,188,357 | 2/1980 | Go ....................................... 528/173 |
| 4,196,275 | 4/1980 | Go ....................................... 528/173 |
| 4,307,060 | 12/1981 | Go ....................................... 528/173 |
| 4,330,661 | 5/1982 | Go ....................................... 528/173 |

Primary Examiner—Lester L. Lee
Attorney, Agent, or Firm—Thomas L. Farquer; M. E. Click; D. H. Wilson, Jr.

[57] ABSTRACT

Copolyesters of iso- or terephthalic acid, ethylene glycol, 1,3 bis(2-hydroxyethoxy) benzene, and possibly other diols, have lower $O_2$ and $CO_2$ permeabilities because of the 1,3 bis(2-hydroxyethoxy) benzene reactant. Also disclosed are hollow containers, sheet and film made from such copolyesters.

7 Claims, No Drawings

COPOLYESTERS

This invention relates to copolyesters based on terephthalic or isophthalic acids or both, which contain 1,3 bis(2-hydroxyethoxy)benzene as one of the diol reactants in order to prepare solid copolyesters having lower oxygen and carbon dioxide permeabilities than without such co-reactant.

Polyesters based on terephthalic acid and ethylene glycol and copolyesters based on isophthalic acid and ethylene glycol are well known for making containers and packaging materials such as film and sheet. When terephthalic acid is used as the acid reactant, the polymer is highly crystallizable, which is highly desirable for many applications. When isophthalic acid is used, the polymer is only difficulty crystallizable, if at all, and also has a somewhat lower glass transition temperature than when terephthalic acid is used. It is also currently more expensive.

Another important property for many packaging applications is low permeability to gases such as carbon dioxide and oxygen. Both polymers are satisfactory in this respect for many packaging applications, but for applications where a very low permeability is required, isophthalic acid can be chosen because it is much less permeable when polymerized with ethylene glycol than is terephthalic acid, particularly if the application does not require a crystallizable polymer. Of course, any mixture of the two acids can be used to make a copolyester, and such copolyesters have intermediate properties. With any of the foregoing polymers, it is often desirable to lower the carbon dioxide and oxygen permeabilities by suitable modification.

I have now discovered that the oxygen and carbon dioxide permeabilities of such polyesters can be lowered by replacing part of the diol with 1,3 bis(2-hydroxyethoxy)benzene.

Thus, according to one aspect of the present invention there is provided a solid thermoplastic copolyester consisting essentially of the polymeric reaction product of:

(A) reactant(s) selected from isophthalic acid, terephthalic acid, and their $C_1$ to $C_4$ alkyl esters, and any mixture thereof in any proportion, (B) reactants, 1,3 bis(2-hydroxyethoxy)benzene plus ethylene glycol, and optionally one or more other ester forming dihydroxy organic hydrocarbon reactant(s), and, optionally, (C) reactant, bis(4-$\beta$-hydroxyethoxyphenyl) sulfone, wherein (1) the amount of said 1,3 bis(2-hydroxyethoxy)benzene is 5–90, usually not less than 10 or more than 80, mol percent of the amount of A reactants, (2) the combined amount of B and C reactants is about 110 to 300 mol percent of the amount of A reactants, (3) the amount of said other ester forming dihydroxy organic hydrocarbon reactant(s) is zero to 20, usually zero to 15, mol percent of the amount of said A reactants, and (4) the combined amount of said (C) reactant plus said 1,3 bis(2-hydroxyethoxy)benzene and said other ester forming dihydroxy organic hydrocarbon reactant(s) is not over 90 mol percent of said A reactants.

In the foregoing copolyesters the optional C reactant, bis(4-$\beta$-hydroxyethoxyphenyl) sulfone, is used when it is necessary to raise the glass transition temperature of the composition for a particular application or use.

When less than 5 mol percent of 1,3 bis(2-hydroxyethoxy) benzene is used, the effect on permeabilities is not as significant as desired. When over 90 mol percent is used, the reaction or polycondensation rate is lower than desired.

When it is stated herein that the reactants "consist essentially of" certain reactants, this means that the reactants positively recited are essential, but that the usual other ingredients can be included, such as colorants, inert fillers, polymerization catalysts, cross-linking agents to improve melt strength (see my U.S. Pat. No. 4,188,357, issued Feb. 12, 1980, and U.S. Pat. No. 4,307,060 issued Dec. 22, 1981, wherein from 0.1 to 0.7 mol percent of trimellitic acid anhydride, trimesic acid, or a triol, $RC(CH_2OH)_3$, where R is methyl or ethyl, is included to increase melt strength). Such other ingredients can be included if they do not deleteriously affect the basic and novel characteristics of the products of my invention or of the process of the present invention, as they are described herein.

The copolyesters of the invention are solid copolyesters having an inherent viscosity of at least 0.4 dl/g., usually at least 0.5 and for most commercial applications, at least 0.7 dl/g. The inherent viscosities referred to herein are those measured at 25° C., using a solution of 0.25 gms. of polymer dissolved in 100 milliliters of a mixture of 3 weight parts phenol with 2 weight parts 1,1,2,2 tetrachloro-ethane.

In the following illustrative examples and in the claims, the oxygen and carbon dioxide permeabilities refer to the determinations made on substantially unoriented pressed films.

The glass transition temperature, Tg, was determined using a Perkin-Elmer Differential Scanning Calorimeter, Model DSC-2, in a manner similar to that described in U.S. Pat. No. 3,822,322, issued July 2, 1974, using a heating rate of 10° C./minute.

EXAMPLE 1

Into a 1-liter stainless steel reactor equipped with a storer, nitrogen gas inlet port and a condenser, the following were added:

| | |
|---|---|
| 233 g | dimethyl terephthalate |
| 167.6 g | ethylene glycol |
| 59.4 g | 1,3 bis(2-hydroxyethoxy)benzene |
| 0.0660 g | titanyl acetylacetonate |
| 0.0874 g | $Sb_2O_3$ |
| 0.0303 g | manganese hypophosphite monohydrate |
| 0.0114 g | tetrasodium ethylenediaminetetraacetate |
| 0.4325 g | 1,1,1 tris hydroxymethyl ethane |

The reaction mixture was heated at 200° C. for 1 hour and 20 minutes under nitrogen atmosphere. Methanol was continuously distilled out during this period. Then 0.4128 g of tris(nonylphenyl)phosphite was added to the mixture in the reactor. The reaction temperature was increased to 250° C. and maintained for 1 hour under nitrogen atmosphere. Then the nitrogen gas flow was stopped and a vacuum of less than 0.4 mm Hg was applied. The reaction was continued at 275° C. under less than 0.4 mm Hg for 2 hours, 50 minutes. The co-polyester has an inherent viscosity of 0.86 dl/g. The glass transition temperature was 72° C. The $O_2$ and $CO_2$ gas permeabilities were 5.9 and 35.8 cc.·mil/100 in.$^{-2}$·day·atm., respectively.

EXAMPLE 2

Poly(ethylene terephthalate) was prepared as follows:

Into a 500 ml 3-necked round bottom flask, equipped with a nitrogen gas inlet tube, stirrer and a condenser, the following compounds were added:

| | |
|---|---|
| 46.5 g | dimethyl terephthalate |
| 35.4 g | ethylene glycol |
| 0.0263 g | zinc acetate dihydrate |
| 0.01398 g | antimony trioxide |

The contents of the flask were heated at 220° C. under nitrogen atmosphere for 3 hours. During this time, methanol was distilled off. Then the reaction temperature was raised to 280° C., nitrogen flow was stopped and vacuum was gradually applied until less than 0.5 mm Hg. Excess ethylene glycol was continuously distilled off. The reaction was stopped after 4 hours. The inherent viscosity was 0.83, the glass transition temperature was 72° C., the oxygen permeability was 8.5 cc.·mil/100 in.$^2$·day·atm. and the carbon dioxide permeability was 55.3 cc.·mil/100 in.$^2$·day·atm.

EXAMPLE 3

Into a 1-liter stainless steel reactor equipped with a stirrer, nitrogen gas inlet port and a condenser, the following were added:

| | |
|---|---|
| 233.0 g | dimethyl terephthalate |
| 134.1 g | ethylene glycol |
| 166.3 g | 1,3 bis(2-hydroxyethoxy)benzene |
| 0.4325 g | 1,1,1 tris(hydroxymethyl)ethane |
| 0.0114 g | titanyl acetylacetonate |
| 0.0874 g | Sb$_2$O$_3$ |
| 0.0114 g | tetrasodium ethylenediaminetetraacetate |
| 0.0303 g | manganese hypophosphite monohydrate |

The reaction mixture was heated at 200° C. for 1 hour under nitrogen atmosphere. Methanol was continuously distilled out during this period. Then 0.4128 g of tris (nonylphenyl) phosphite was added to the mixture in the reactor. The reaction temperature was increased to 250° C. and maintained for 55 minutes under nitrogen atmosphere. Then the nitrogen gas flow was applied. The reaction was continued at 270° C. under less than 0.4 mm Hg for 5½ hours. The copolyester had an inherent viscosity of 0.65. The glass transition temperature was 64° C. The O$_2$ and CO$_2$ gas permeabilities were 3.8 and 22.4 cc·mil/100 in.$^2$·day·atm., respectively.

EXAMPLE 4

Into a 1-liter stainless steel reactor equipped with a stirrer, nitrogen gas inlet port and a condenser, the following were added:

| | |
|---|---|
| 332.3 g | isophthalic acid |
| 192.2 g | ethylene glycol |
| 19.8 g | 1,3 bis(2-hydroxyethoxy)benzene |
| 0.1100 g | titanyl acetylacetonate |
| 0.1458 g | Sb$_2$O$_3$ |
| 0.0190 g | tetrasodium ethylenediaminetetraacetate |
| 0.7209 g | 1,1,1 tris(hydroxymethyl)ethane |

The reaction mixture was heated at 220° C. for 1 hour, and then at 240° C. for 40 minutes under nitrogen atmosphere. Water was continuously distilled out during this period. Then 0.688 g of tris (nonylphenyl) phosphite was added to the mixture in the reactor. The reaction temperature was increased to 250° C. and maintained for 50 minutes under nitrogen atmosphere. Then the nitrogen gas flow was stopped and a vacuum of less than 0.4 mm Hg was applied. The reaction was continued at 270° C. under less than 0.4 mm Hg for 3 hours, 55 minutes. The copolyester had an inherent viscosity of 0.83. The glass transition temperature was 61° C. The O$_2$ and CO$_2$ gas permeabilities were 1.6 and 7.1 cc.·mil/100 in.$^2$·day·atm., respectively.

EXAMPLE 5

Into a 1-liter stainless steel reactor equipped with a stirrer, nitrogen gas inlet port and a condenser, the following were added:

| | |
|---|---|
| 332.3 g | isophthalic acid |
| 180 g | ethylene glycol |
| 59.4 g | 1,3 bis(2-hydroxyethoxy)benzene |
| 0.7209 g | 1,1,1 tris(hydroxymethyl)ethane |
| 0.1100 g | titanyl acetylacetonate |
| 0.1458 g | Sb$_2$O$_3$ |
| 0.019 g | tetrasodium ethylenediaminetetraacetate |

The reaction mixture was heated at 220° C. for 1 hour, and then at 240° C. for 30 minutes under nitrogen atmosphere. Water was continuously distilled out during this period. Then 0.688 g of tris (nonylphenyl) phosphite was added to the mixture in the reactor. The reaction temperature was increased to 250° C. and maintained for 40 minutes under nitrogen atmosphere. Then the nitrogen gas flow was stopped and a vacuum of less than 0.4 mm Hg was applied. The reaction was continued at 270° C. under less than 0.4 mm Hg for 4½ hours. The copolyester had an inherent viscosity of 0.82. The glass transition temperature was 60° C. The O$_2$ and CO$_2$ gas permeabilities were 1.6 and 6.6 cc.·mil/100 in.$^2$·day·atm., respectively.

EXAMPLE 6

Into a 1-liter stainless steel reactor equipped with a stirrer, nitrogen gas inlet port and a condenser, the following were added:

| | |
|---|---|
| 139.5 g | isophthalic acid |
| 59.8 g | terephthalic acid |
| 107.9 g | ethylene glycol |
| 35.6 g | 1,3 bis(2-hydroxyethoxy)benzene |
| 0.4325 g | 1,1,1 tris(hydroxymethyl)ethane |
| 0.066 g | titanylacetonate |
| 0.0874 g | Sb$_2$O$_3$ |
| 0.0114 g | tetrasodium ethylenediaminetetraacetate |
| 0.0303 g | manganese hypophosphite monohydrate |

The reaction mixture was heated at 220° C. for 1 hour, and then at 240° C. for 25 minutes under nitrogen atmosphere. Water was continuously distilled out during this period. The 0.1862 g of tris (nonylphenyl) phosphite was added to the mixture in the reactor. The reaction temperature was increased to 250° C. and maintained for 35 minutes under nitrogen atmosphere. Then the nitrogen gas flow was stopped and a vacuum of less than 0.4 mm Hg was applied. The reaction was continued at 275° C. under less than 0.4 mm Hg for 4 hours, 5 minutes. The copolyester has an inherent viscosity of 0.89. The glass transition temperature was 63° C. The O$_2$ and CO$_2$ gas permeabilities were 2.0 and 9.7 cc.·mil/100 in.$^2$·day·atm., respectively.

EXAMPLE 7

Into a 1-liter stainless steel reactor equipped with a stirrer, nitrogen gas inlet port and a condenser, the following were added:

| | |
|---|---|
| 139.5 g | isophthalic acid |
| 59.8 g | terephthalic acid |
| 100.4 g | ethylene glycol |
| 35.6 g | 1,3 bis(2-hydroxyethoxy)benzene |
| 40.6 g | bis(4-β-hydroxyethoxyphenyl)sulfone |
| 0.4325 g | 1,1,1 tris(hydroxymethyl)ethane |
| 0.0660 g | titanylacetylacetonate |
| 0.0874 g | $Sb_2O_3$ |
| 0.0114 g | tetrasodium ethylenediaminetetraacetate |
| 0.0303 g | manganese hypophosphite monohydrate |

The reaction mixture was heated at 200° C. for 20 minutes, and then at 240° C. for 50 minutes under nitrogen atmosphere. Water was continuously distilled out during this period. Then 0.4128 g of tris (nonylphenyl) phosphite was added to the mixture in the reactor. The reaction temperature was increased to 250° C. and maintained for 25 minutes under nitrogen atmosphere. Then the nitrogen gas flow was stopped and a vacuum of less than 0.4 mm Hg was applied. The reaction was continued at 270° C. under less than 0.4 mm Hg for 4 hours. The copolyester had an inherent viscosity of 0.77. The glass transition temperature was 72° C. The $O_2$ and $CO_2$ gas permeabilities were 2.5 and 12.9 cc.-mil/100 in.$^2$·day·atm., respectively.

EXAMPLE 8

Into a 1-liter stainless steel reactor equipped with a stirrer, nitrogen gas inlet port and a condenser, the following were added:

| | |
|---|---|
| 139.5 g | isophthalic acid |
| 59.8 g | terephthalic acid |
| 100.4 g | ethylene glycol |
| 35.6 g | 1,3 bis(2-hydroxyethoxy)benzene |
| 17.3 g | 1,4 trans cyclohexanedimethanol |
| 0.0660 g | titanylacetylacetonate |
| 0.0874 g | $Sb_2O_3$ |
| 0.0114 g | tetrasodium ethylenediaminetetraacetate |
| 0.0303 g | manganese hypophosphite monohydrate |
| 0.4325 g | 1,1,1 tris(hydroxymethyl)ethane |

The reaction mixture was heated at 200° C. for 1 hour, and then at 240° C. for 1 hour under nitrogen atmosphere. Water was continuously distilled out during this period. Then 0.4128 g of tris (nonylphenyl) phosphite was added to the mixture in the reactor. The reaction temperature was increased to 250° C. and maintained for 30 minutes under nitrogen atmosphere. Then the nitrogen gas glow was stopped and a vacuum of less than 0.4 mm Hg was applied. The reaction was continued at 270° C. under less than 0.4 mm Hg for 4 hours. The copolyester had an inherent viscosity of 0.81. The glass transition temperature was 63° C. The $O_2$ and $CO_2$ gas permeabilities were 3.3 and 15.3 cc.-mil/100 in.$^2$·day·atm., respectively.

EXAMPLE 9

Into a 1-liter stainless steel reactor equipped with a stirrer, nitrogen gas inlet port and a condenser, the following were added:

| | |
|---|---|
| 139.5 g | isophthalic acid |
| 59.8 g | terephthalic acid |
| 78.2 g | ethylene glycol |
| 35.6 g | 1,3 bis(2-hydroxyethoxy)benzene |
| 12.5 g | neopentyl glycol |
| 0.4325 g | 1,1,1 tris(hydroxymethyl)ethane |
| 0.0660 g | titanyl acetylacetonate |
| 0.0874 g | $Sb_2O_3$ |
| 0.0114 g | tetrasodium ethylenediaminetetraacetate |
| 0.0303 g | manganese hypophosphite monohydrate |

The reaction mixture was heated at 240° C. for 1 hour under 35 psi nitrogen atmosphere, and then the pressure was lowered to atmospheric. Water was continuously distilled out during this period. Then 0.4128 g of tris (nonylphenyl) phosphite was added to the mixture in the reactor. The reaction temperature was increased to 250° C. and maintained for 20 minutes under nitrogen atmosphere. Then the nitrogen gas flow was stopped and a vacuum of less than 0.4 mm Hg was applied. The reaction was continued at 270° C. under less than 0.4 mm Hg for 4 hours. The copolyester had an inherent viscosity of 0.90. The glass transition temperature was 65° C. The $O_2$ and $CO_2$ gas permeabilities were 3.0 and 10.2 cc.-mil/100 in.$^2$·day·atm., respectively.

EXAMPLE 10

Into a 1-liter stainless steel reactor equipped with a stirrer, nitrogen gas inlet port and a condenser, the following were added:

| | |
|---|---|
| 179.4 g | isophthalic acid |
| 19.9 g | terephthalic acid |
| 78.2 g | ethylene glycol |
| 35.6 g | 1,3 bis(2-hydroxyethoxy)benzene |
| 17.8 g | diethylene glycol |
| 0.0660 g | titanyl acetylacetonate |
| 0.0874 g | $Sb_2O_3$ |
| 0.4325 g | 1,1,1 tris(hydroxymethyl)ethane |
| 0.0114 g | tetrasodium ethylenediaminetetraacetate |
| 0.0303 g | manganese hypophosphite monohydrate |

The reaction mixture was heated at 240° C. for 1 hour under 35 psi nitrogen atmosphere, and then the pressure was lowered to atmospheric. Water was continuously distilled our during this period. Then 0.4128 g of tris (nonylphenyl) phosphite was added to the mixture in the reactor. The reaction temperature was increased to 250° C. and maintained for 20 minutes under nitrogen atmosphere. Then the nitrogen gas flow was stopped and a vacuum of less than 0.4 mm Hg was applied. The reaction was continued at 270° C. under less than 0.4 mm Hg for 5 hours. The copolyester had an inherent viscosity of 0.84. The glass transition temperature was 59° C. The $O_2$ and $CO_2$ gas permeabilities were 2.3 and 11.3 cc.-mil/100 in.$^2$·day·atm., respectively.

EXAMPLE 11

Into a 1-liter stainless steel reactor equipped with a stirrer, nitrogen gas inlet port and a condenser, the following were added:

| | |
|---|---|
| 199.3 g | isophthalic acid |
| 89.4 g | ethylene glycol |
| 213.8 g | 1,3 bis(2-hydroxyethoxy)benzene |
| 0.4325 g | 1,1,1 tris(hydroxymethyl)ethane |
| .0660 g | titanyl acetylacetonate |
| 0.0874 g | $Sb_2O_3$ |
| 0.0114 g | tetrasodium ethylenediaminetetraacetate |

| 0.0303 g | manganese hypophosphite monohydrate |

The reaction mixture was heated at 200° C. for ½ hour, and then at 240° C. for 1 hour under nitrogen atmosphere. Water was continuously distilled out during this period. Then 0.4128 g of tris (nonylphenyl) phosphite was added to the mixture in the reactor. The reaction temperature was increased to 250° C. and maintained for 40 minutes under nitrogen atmosphere. Then the nitrogen gas flow was stopped and a vacuum of less than 0.4 mm Hg was applied. The reaction was continued at 275° C. under less than 0.4 mm Hg for 5½ hours. The copolyester had an inherent viscosity of 0.45.

As noted, the solid copolyesters of the invention are contemplated as especially useful in packaging applications because of their combination of properties, including permeabilities, such as in making hollow containers and film and sheet useful for packaging. Thus, another aspect of the invention contemplates such products made of such copolyesters. Such containers may be made by blow molding or by injection molding, or by other known processes.

As will be evident to those skilled in the art, various modifications of this invention can be made or followed in the light of the foregoing disclosure and discussion without departing from the spirit and scope of the disclosure or from the scope of the claims.

As used herein and in the claims the recited "ester forming dihydroxy organic hydrocarbon reactants" means simple hydrocarbons wherein two hydrogens bonded to two C atoms are replaced by hydroxyl groups; and also similarly hydroxylated oxyhydrocarbons, i.e., ethers, wherein carbon atoms are connected by —O— bonds. For instance, the diethylene glycol of Example 10 is included in the term. The term of course excludes compounds containing other than C, H and O atoms.

I claim:
1. A solid thermoplastic copolyester consisting essentially of the polymeric reaction product of
   (A) reactant(s) selected from isophthalic acid, terephthalic acid and their $C_1$ to $C_4$ alkyl esters, and any mixture thereof in any proportion,
   (B) reactants, 1,3 bis(2-hydroxyethoxy)benzene plus ethylene glycol, and optionally one or more other ester forming dihydroxy organic hydrocarbon reactant(s), and optionally,
   (C) reactant, bis(4-$\beta$-hydroxyethoxyphenyl) sulfone, wherein
   (1) the amount of said 1,3 bis(2-hydroxyethoxy)benzene is 5-90 mol percent of the amount of A reactants,
   (2) the combined amount of B and C reactants is about 110 to 300 mol percent of the amount of A reactants,
   (3) the amount of said other ester forming dihydroxy organic hydrocarbon reactant(s) is zero to 20 mol percent of the amount of said A reactants, and
   (4) the combined amount of said (C) reactant plus said 1,3 bis(2-hydroxyethoxy)benzene and said other ester forming dihydroxy organic hydrocarbon reactant(s) is not over 90 mol percent of said A reactants.

2. A copolyester of claim 1 wherein the amount of 1,3 bis(2-hydroxyethoxy)benzene is not more than 80 mol percent of the A reactants.

3. A copolyester of claim 2 wherein the amount of 1,3 bis(2-hydroxyethoxy)benzene is not less than 10 mol percent of the A reactants.

4. A copolyester of claim 1 wherein terephthalic acid or its $C_1$ to $C_4$ alkyl esters is selected.

5. Hollow containers having a composition of claim 1.

6. Sheet or film having a composition of claim 1.

7. The copolyester of claim 1 wherein the amount of said dihydroxy organic hydrocarbon reactant(s) is zero to 15 mol percent of the amount of said A reactants.

* * * * *

UNITED STATES PATENT OFFICE
CERTIFICATE OF CORRECTION

PATENT NO. : 4,398,017
DATED : August 9, 1983
INVENTOR(S) : Santos W. Go

It is certified that error appears in the above-identified patent and that said Letters Patent are hereby corrected as shown below:

Col. 1, line 17, "difficulty" should be --difficultly--;
Col. 3, line 36, "0.0114 g tetrasodium ethylenediaminetetraacetate" should be --0.0660 g tetrasodium ethylenediaminetetraacetate--.

Signed and Sealed this

Fourth Day of October 1983

[SEAL]

Attest:

GERALD J. MOSSINGHOFF

Attesting Officer    Commissioner of Patents and Trademarks